(12) United States Patent
Galas

(10) Patent No.: US 7,870,697 B2
(45) Date of Patent: Jan. 18, 2011

(54) SKIRTING BOARD

(76) Inventor: Adam Galas, ul. Ciolkowskiego 11/5, Bialystok (PL) 15-245

( * ) Notice: Subject to any disclaimer, the term of this patent is extended or adjusted under 35 U.S.C. 154(b) by 565 days.

(21) Appl. No.: 10/580,163

(22) PCT Filed: Nov. 19, 2004

(86) PCT No.: PCT/US2004/039247

§ 371 (c)(1),
(2), (4) Date: May 18, 2006

(87) PCT Pub. No.: WO2005/052277

PCT Pub. Date: Jun. 9, 2005

(65) Prior Publication Data

US 2008/0202049 A1    Aug. 28, 2008

(30) Foreign Application Priority Data

Nov. 19, 2003  (PL) ................................. 114468 U
Nov. 4, 2004   (PL) ..................................... 370968

(51) Int. Cl.
E06B 1/04 (2006.01)
(52) U.S. Cl. .................... 52/211; 52/212; 52/287.1; 52/290; 52/716.1; 52/716.7
(58) Field of Classification Search .............. 52/211, 52/212, 213, 287.1, 288.1, 290, 716.1, 716.6, 52/716.7, 718.01, 718.04, 312, 372, 375, 52/631
See application file for complete search history.

(56) References Cited

U.S. PATENT DOCUMENTS

| | | | | |
|---|---|---|---|---|
| 1,488,090 A * | 3/1924 | Buhr | .......................... | 52/288.1 |
| 3,473,278 A * | 10/1969 | Gossen | ....................... | 52/288.1 |
| 4,165,577 A * | 8/1979 | Shanahan et al. | .............. | 43/112 |
| 5,243,800 A * | 9/1993 | Olbrich | ...................... | 52/287.1 |
| 6,148,584 A * | 11/2000 | Wilson | ..................... | 52/717.01 |
| 6,191,363 B1 * | 2/2001 | Samuels | ..................... | 174/68.3 |
| 6,381,915 B1 * | 5/2002 | Wood | ....................... | 52/718.06 |

FOREIGN PATENT DOCUMENTS

| | | |
|---|---|---|
| PL | 0060484 Y1 | 5/2004 |
| PL | 0063142 Y1 | 5/2007 |
| WO | WO 2005/052277 A2 | 6/2005 |
| WO | WO 2005/052277 A3 | 6/2005 |

OTHER PUBLICATIONS

International Search Report dated Oct. 4, 2005 for PCT Application PCT/US04/39247.
International Preliminary Report on Patentability and Written Opinion of the International Search Authority issued on May 22, 2006 with respect to PCT/US2004/039247.

* cited by examiner

Primary Examiner—Richard E Chilcot, Jr.
Assistant Examiner—Jessica Laux
(74) Attorney, Agent, or Firm—Neal, Gerber & Eisenberg LLP

(57) ABSTRACT

A skirting board comprising a base profile and a guard profile. The base profile comprises a receiving portion and a deflecting arm. The guard profile comprises a protruding portion, that interfaces with the receiving portion of the base profile, and a curved portion. The guard profile combines with the base profile to provide at least one open space. Finally, the deflecting arm and the curved portion combine to provide a surface used to finish a corner produced by a floor and a wall.

7 Claims, 4 Drawing Sheets

SKIRTING BOARD

CROSS-REFERENCE

This application is claiming the priority of Patent Cooperation Treaty Application assigned International Application No. PCT/US2004/039247 filed on Nov. 19, 2004, which claims priority from Polish Application No. W114468 filed on Nov. 19, 2003. The terms of both applications are incorporated herein by reference.

FIELD OF THE PRESENT INVENTION

The Present Invention relates generally to baseboards and, in particular, to baseboards for use in finishing work indoors in an effort to both provide an aesthetically-pleasing appearance, as well as to provide a means by which a user may install such a baseboard and to provide a means by which a user may guide wires and the like.

BACKGROUND OF THE INVENTION

The description of the references, if any, cited in this Section is not intended to constitute an admission that any reference cited herein is "Prior Art" with respect to the Present Invention, unless designated as such.

It is known that a baseboard may comprise, generally, a skirt and a guard element. In such cases, the guard skirt is fixed to a wall and provided with longitudinal guiding projections. These guiding projections interface with elastic longitudinal projections of the guard element.

Specifically, from the description of Polish Utility Model Patent No. W-114468, the contents of which are hereby incorporated herein in their entirety, it is known a skirting board structure comprising an open base profile and a guard profile to be set in it by means of two webs. The guard profile of this skirting has two guard arms having different length. The open base profile is trapezial shaped in cross-sectional view. The base profile has a narrowing at the outer edge being limited by two oblique surfaces and an outwardly deflected arm. A long arm of the guard profile is placed in one line with the outwardly deflected profile and is its extension. On the inner side, the guard profile is provided with two deviated settlement webs having bulges on outer walls and being interrelated to the shaped edges of the base profile.

Further, the description of Polish Protective Right No. 60484, the contents of which are hereby incorporated herein in their entirety, presents a structure of a skirting board which comprises two longitudinal elements being separately connected and corner joint elements. The joint elements comprise several portions which require an appropriate connection while assembling, wherein assembly or disassembly of the corner elements requires a longitudinal displacement of the longitudinal skirting elements, which considerably complicate assembling operations.

Thus, a need exists for a skirting board which overcomes the above-stated disadvantages.

SUMMARY OF THE PRESENT INVENTION

One object of the Present Invention relates to a skirting board used to finish the aesthetics of a wall, and the construction thereof, to finish the aesthetics of a corner produced by a floor and wall, to finish the aesthetics of corner portions, and to provide a means to carry and dispose cables, wires and the like.

Another object of the Present Invention is a skirting system and more particularly a skirting board system, advantageously made of plastics material. Skirting of that type is used in particular for the protection of edges of building elements and as a guard of varied conduits arranged along the walls.

Another object of the Present Invention is a skirting system, in particular a skirting board system comprising a longitudinal skirting and joint elements. The longitudinal skirting consists of two separately connected longitudinal elements, and the joint elements are provided on the inner side with projections.

The gist of the Present Invention consists therein that a lower section having an expansion channel and a lower profile arm constitutes one of the longitudinal skirting elements. The second element constitutes a guard provided with click webs and an upper guard arm. The click webs of each joint element in form of an inner and outer corner element are clickway connected to expansion channel walls of lower sections of the longitudinal skirting. Pairs of click webs of the inner corner element and pairs of click webs of the outer corner element are fixed on the same level, corresponding with the level on which a longitudinal gap of the expansion channels is located.

Advantageously, two horizontal longitudinal click webs fixed on different levels are located in the lower guard part on its inner side, wherein the terminal portion of each of these webs is appropriate down- and upwardly deflected and has an arched tailpiece.

In the solution according to the Present Invention, a longitudinal lower profile arm is attached to a lower output edge of the expansion channel, wherein this arm is archway bended and outwardly deflected.

Due to the solution according to the Present Invention fitting of the skirting system is remarkably simple and does not require any complicated tooling. A click joint of two longitudinal skirting elements makes a disassembly of the skirting, as well as a renewed assembly of it easier, for example in case when it is necessary to replace conductors arranged under the skirting.

A structure of the joint corner elements allows to remove them and afterwards to arrange them once again without necessary change of the position of the outer skirting guard because these elements are fixed from the outside and are clickway connected to the expansion channel walls of the lower skirting section.

According to the tenets and teachings of the Present Invention, a skirting board comprising a base profile and a guard profile is provided. The base profile comprises a receiving portion and a deflecting arm. The guard profile comprises a protruding portion, that interfaces with the receiving portion of the base profile, and a curved portion. The guard profile combines with the base profile to provide at least one open space. Finally, the deflecting arm and the curved portion combine to provide a surface used to finish a corner produced by a floor and a wall.

Other objects and advantages of the Present Invention will be apparent from the following Detailed Discussion of Exemplary Embodiments Of The Present Invention, with reference to the Figures and Claims, attached hereto and disclosed herein.

BRIEF DESCRIPTION OF THE DRAWINGS

In the interest of enabling one of skill in the art to practice the Present Invention, exemplary embodiments are illustrated and described. For clarity and brevity, details apparent to those of skill in the art without undue experimentation are generally omitted from the Figures and Description, in which.

DETAILED DESCRIPTION OF THE EXEMPLARY EMBODIMENTS

Figure 1:
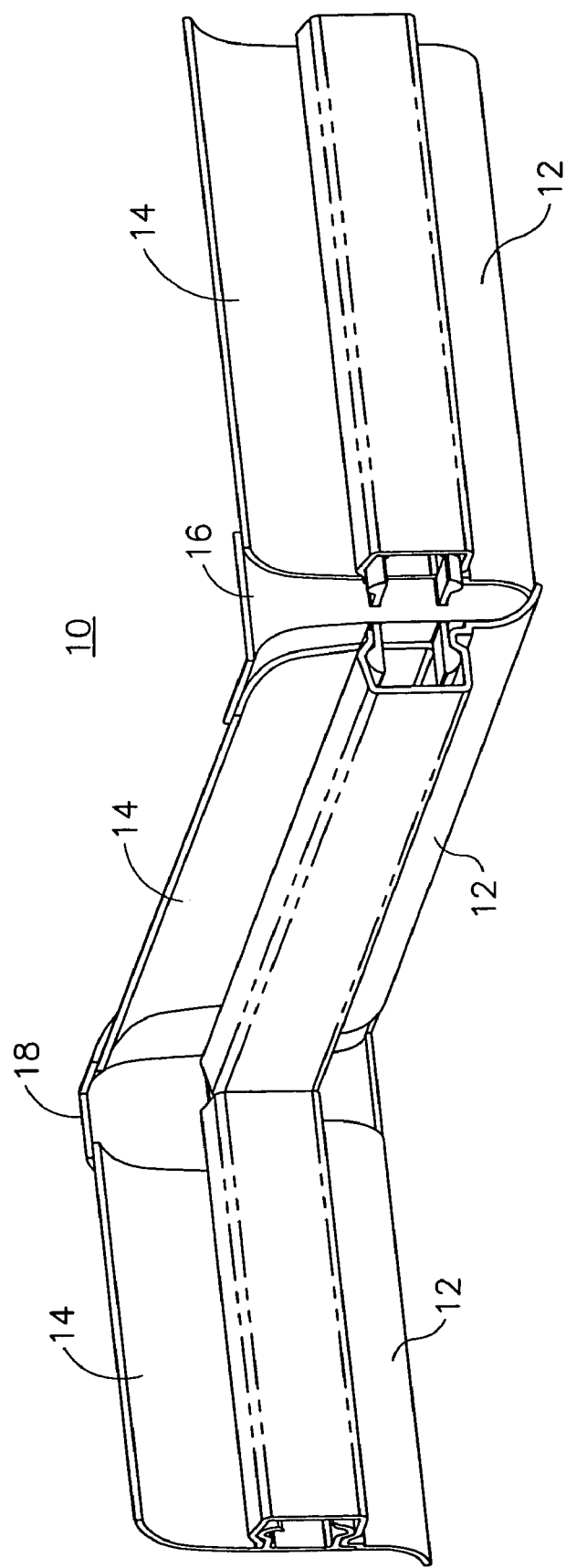
FIG. 1 illustrates a perspective view of a skirting board, manufactured in accordance with tenets and teachings of the Present Invention.

The Present Invention is generally discussed, concentrated and directed to a skirting board for use as a baseboard unit. More specifically, the skirting board comprises, inter alia, two portions which combine to provide an aesthetic and utilitarian skirting board. However, other uses will be apparent from the tenets and teachings discussed therein. The Present Invention will be better understood from the following Detailed Description Of The Exemplary Embodiments with reference to the attached Figures, wherein like reference numerals and characters are intended to refer to the like parts, and by reference to the following Claims. Further, all specifics of the various embodiments of the Present Invention are neither illustrated in the Figures nor addressed in this discussion, as, in some cases, the general operation of such embodiments is currently known in the art.

FIG. 1 illustrates a perspective view of one embodiment of the skirting board of the Present Invention. Referring to FIG. 1, skirting board 10 comprises base profile 12, guard profile 14, inward-projecting endcap 16 and outward-projecting endcap 18.

Figure 2:
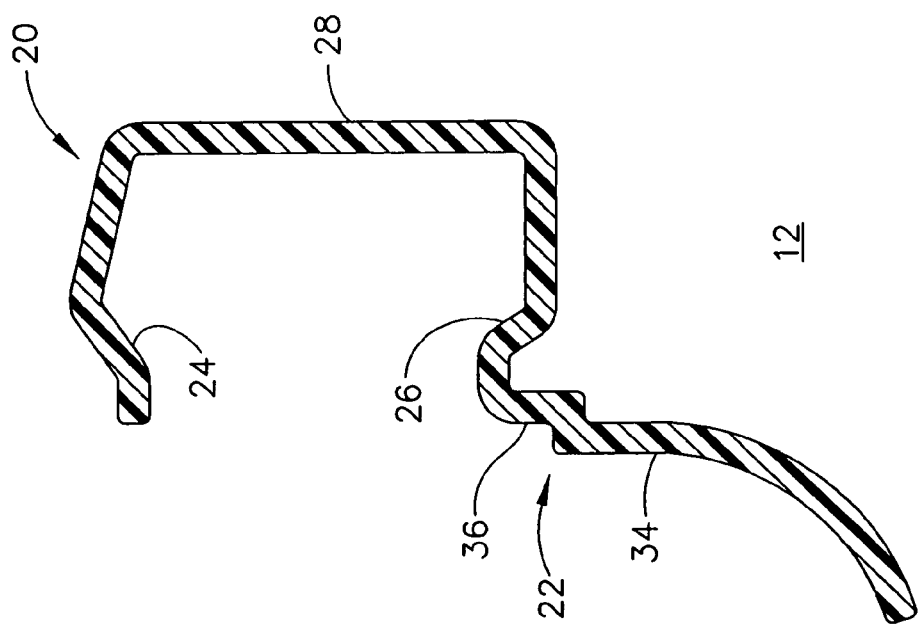
FIG. 2 illustrates a cross-sectional view of a base profile of the skirting board of FIG. 1.

FIG. 2 illustrates a close up cross-sectional view of base profile 12 of skirting board 10 of the Present Invention. Referring to FIG. 2, base profile 12 is illustrated as comprising generally trapezoidal shaped receiving portion 20 and outwardly-deflecting arm 22. As illustrated in FIG. 2, generally trapezoidal shaped receiving portion 20 is open at one end. It is through this end that receiving portion 20 is adapted to receive a predetermined portion of guard profile 14. Although receiving portion 20 of base profile 12 of skirting board 10 is shown as having a generally trapezoidal shape, it is contemplated that alternative shapes may be utilized. The generally trapezoidal shape of the embodiment of base profile 12 illustrated in FIG. 2 was selected, inter alia, because the arrangement would provide for an adequate "snap fit" configuration between guard profile 14 into base profile 12 (a "snap fit" configuration allows for guard profile 14 to removably and securely fit within base profile 12, in the manner disclosed herein). Thus, it becomes apparent that guard profile 14 must comprise a shape that can be adapted to fit within base profile 12. Reception of guard profile 14 is preferably secured in place through the use of first oblique surface 24 and second oblique surface 26. Thus, it also becomes apparent that, due to the "snap fit" configuration outlined above, the material of which base profile 12 is comprised be a sturdy, yet resilient material. Other characteristics include lightweight, paintable/stainable (for aesthetic purposes) and flexible and may include such materials as, for example, molded or hand plastics, polyvinyl chloride, fiberglass, cellulose materials, acrylonatrile butadeine styrene or any other similar type of rigid, strong composite, alloy or polymer. The interaction of guard profile 14 and base profile 12 will be discussed in more detail herein.

Figure 3:
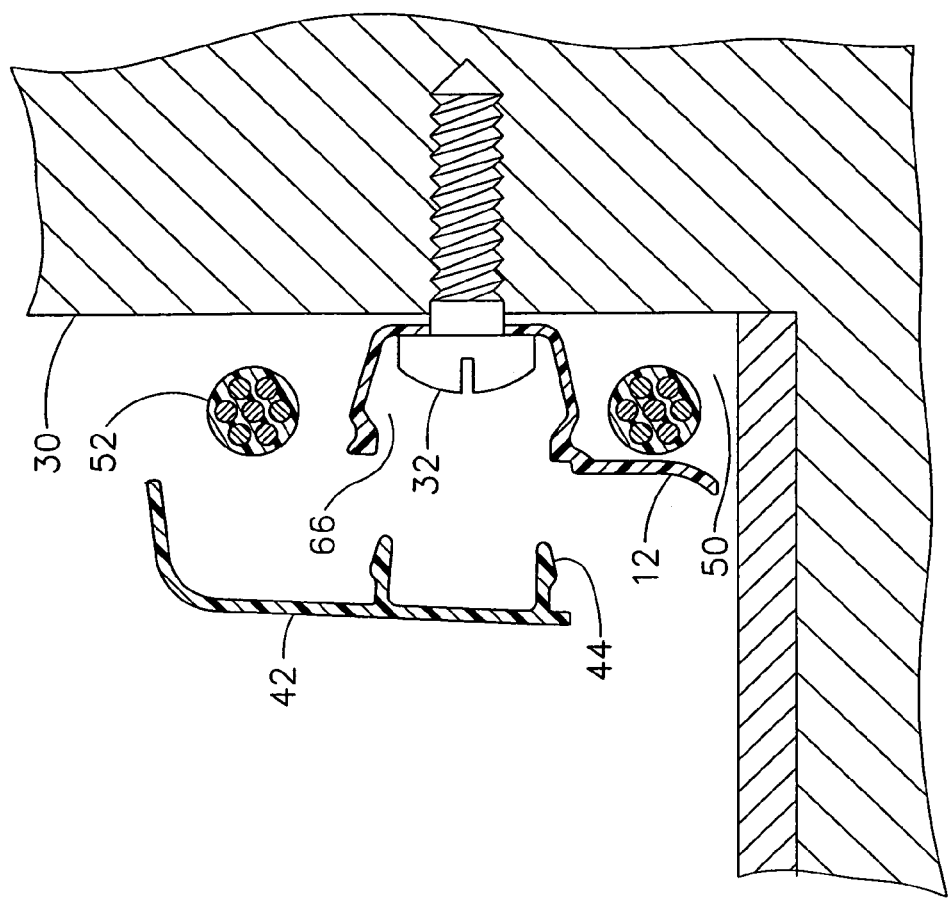
FIG. 3 illustrates a cross-sectional view of the skirting board of FIG. 1, in a preferred setting.

Back side 28 of receiving portion 20 is preferably the part of base profile 12 of skirting board 10 that abuts the lower portion of a wall or other structure. Base profile 12 may be secured to the wall or other structure through the use of a variety of devices and media, such as, for example, glue or any other similar adhesive medium, screws or any other similar affixing device, etc. One embodiment of base profile 12 as attached to structure 30 is illustrated in FIG. 3. In FIG. 3, base profile 12 is illustrated as being secured to structure though the use of screw 32.

Returning FIG. 2, outer end 34 of arm 22 is illustrated. Outer arm 30 is illustrated as being disposed in a manner such as to generally sweep away from receiving portion 20 of base profile 12. Outer end 34 is the portion of base profile 12 that will, upon completion of the installation of skirting board 10, be visible to members of the public. As a result, outer end 34 may possess some aesthetic characteristics. Finally, disposed on arm 22 is ledge 36. Preferably, ledge 36 is shaped to provide a point at which guard profile 14 may rest.

Figure 4:
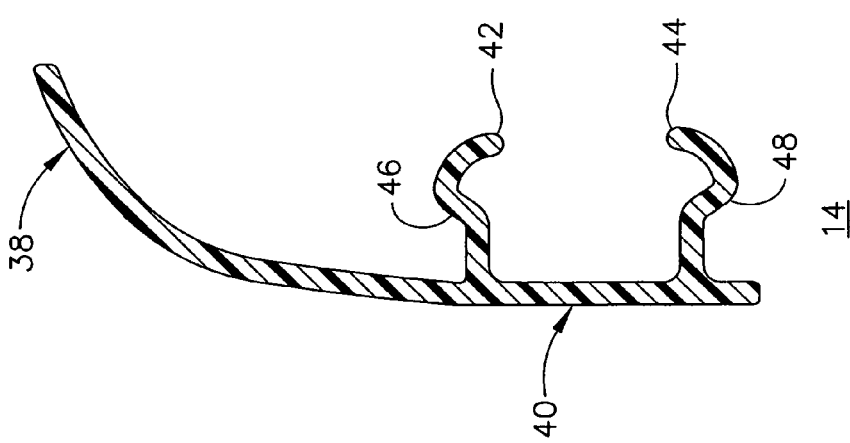
FIG. 4 illustrates a cross-sectional view of a guard profile of the skirting board of FIG. 1.

FIG. 4 illustrates a close up cross-sectional view of guard profile 14 of skirting board 10 of the Present Invention. Referring to FIG. 4, guard profile 14 is illustrated as comprising generally curved portion 38, vertical portion 40, first interface protrusion 42 and second interface protrusion 44. Curved portion 38, like outer end 34, is one of the portions of skirting board 10 that is visible to members of the public. In fact, curved portion 38 represents the top portion of skirting board 10. This explains the curvature of curved portion 38 toward structure 30, as illustrated in FIG. 3. As illustrated in FIG. 4, vertical portion 40 may also be bended at an angle for aesthetic reasons. First and second interface protrusions 42, 44 possess outer walls which have bulges 46, 48, respectively, interrelated to first and second oblique surfaces 24, 26 of base profile 12.

Figure 5:
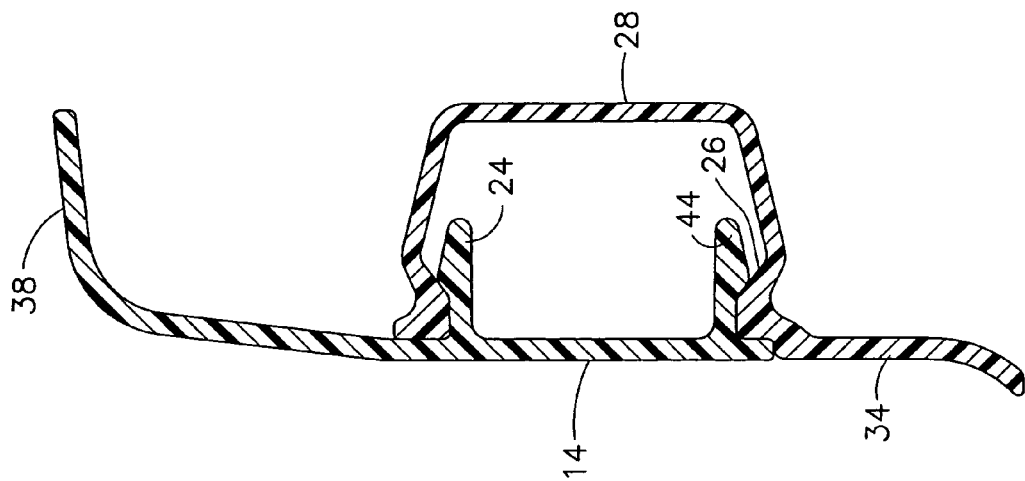
FIG. 5 illustrates a cross-sectional view of the skirting board of FIG. 1, disposed in a "snap fit" relationship.

FIG. 5 illustrates an embodiment of skirting board 10 in which guard profile 14 is disposed, in a "snap fit" configuration, within base profile 12. Referring to FIG. 5, while fitting skirting board 10, guard profile 14 is fastened in base profile 12 by means of first and second interface protrusions 42, 44, the outer bulges 46, 48 of which form a "snap fit" connection with first and second oblique surfaces 24, 26 of base profile 12. After assembling skirting board 10, curved portion 38 of guard profile 14 is placed in one line with arm 22 of base profile 12 and becomes its extension.

When completely assembled, both arms 22, 38 define spaces 50, 52, respectively, where the conductors, wires or telephone cables can be arranged. Further, space 66 is defined as the space between first and second interface protrusions 42, 44 of guard profile 14 and first and second oblique surfaces 24, 26 of base profile 12. Conductors, wires or telephone cables may also be arranged in space 66. As can be ascertained from the FIG. 3, while it may appear easier to utilize spaces 52 and 66, space 50 can also be used.

Figure 6:
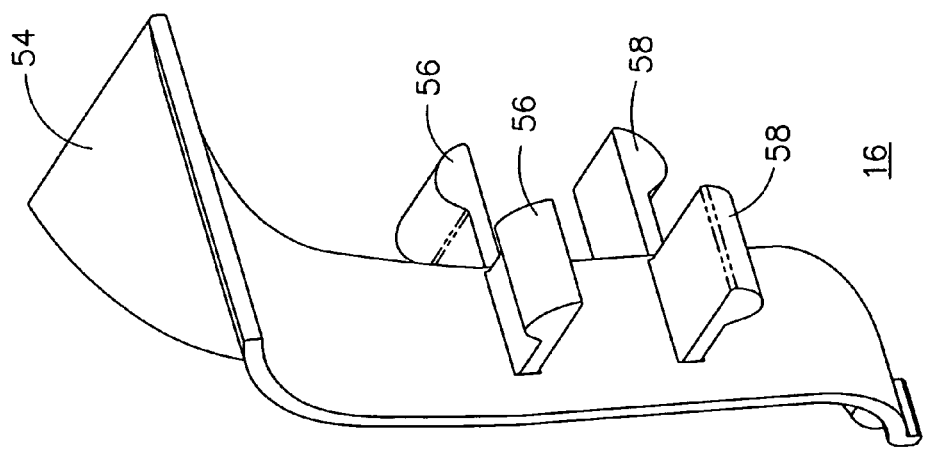
FIG. 6 illustrates a perspective view of an inward-projecting endcap of the skirting board of FIG. 1.

Turning now to FIG. 6, inward-projecting endcap 16 is illustrated. Similar to guard profile 14, inwardly-projecting endcap 16 preferably that portion of skirting board 10 that is disposed at the end of guard profile 14. It is intended to be used when skirting board is installed in a corner, as this provides an appropriate corner interface foil skirting board 10. One distinction between inward-projecting endcap 16 and guard profile 14 is that inward-projecting endcap 16 is shaped to fit completely over base profile 12, rather than a portion thereof. Referring to FIG. 6, inward-projecting endcap 16 comprises covering portion 54, first interface protrusion 56 and second interface protrusion 58. As stated earlier, inward-projecting endcap 16 is intended to completely cover that portion of skirting board 10 that is at the corner of a structure. It is covering portion 54 that fulfills this tenet.

It is intended, as shown in FIG. 6, that inward-projecting endcap 16 fits within to base profile 12 through the use of first and second interface protrusions 56, 58. Preferably, first and second interface protrusions 56, 58 of inward-projecting endcap 16 act in this same capacity as first and second interface portions 42, 44 of guard profile 14.

Figure 7:
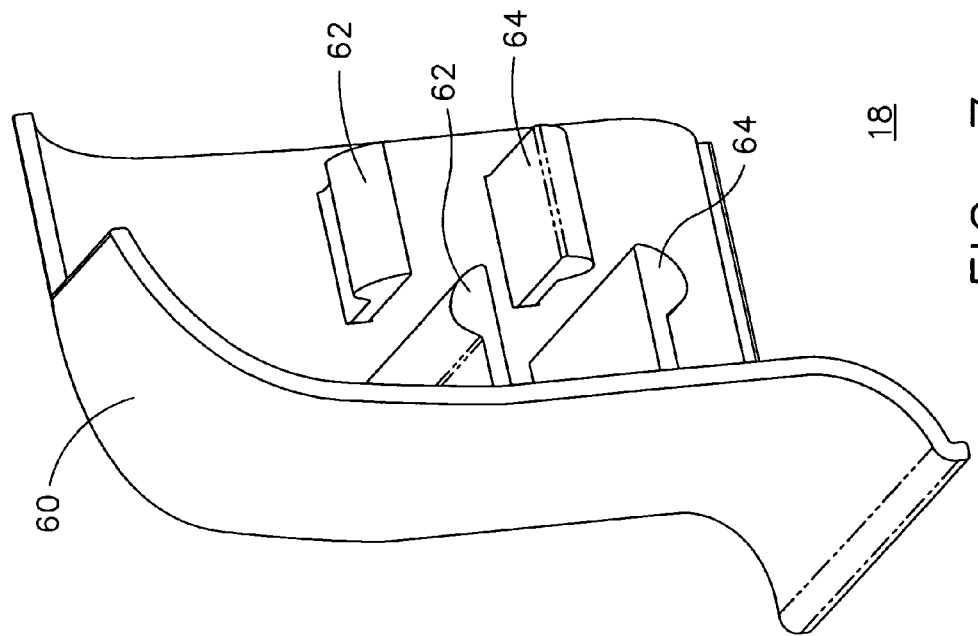
FIG. 7 illustrates a perspective view of an outward-projecting endcap of the skirting board of FIG. 1.

Conversely, FIG. 7 illustrates outward-projecting endcap 18, which is intended to be used when skirting board 10 arrives at an inverted corner (i.e., a "wrap around" corner). To this end, outward-projecting endcap 18 is, essentially, an inverted version of inward-projecting endcap 16. Thus, outward-projecting endcap 18 possesses covering portion 60, first interface protrusion 62 and second interface protrusion 64.

While the Present Invention has been particularly illustrated and described with reference to the particular embodiments thereof, it will be understood by those skilled in the art that various changes in form and detail may be made therein without departing from the spirit and scope of the Present Invention. The scope of the Present Invention is intended to be defined by the following claims as they would be understood by one of ordinary skill in the art with appropriate reference to the specification, including the drawings, as warranted.

What is claimed is:

1. A skirting board comprising: a base profile engaged to a wall and comprising a first arm and a receiving portion having a first and a second oblique surface, wherein the cross-section of the receiving portion is trapezoidal in shape;
   a ledge formed on the base profile;
   a guard profile fastened within the base profile by a pair of interface protrusions, the guard profile comprising a second arm;
   a first open space adapted to receive a wire, wherein the first open space is defined by the base profile, the guard profile and the wall; and
   a second open space adapted to receive a wire wherein the second open space is defined by the base profile, the wall and a floor adjacent to the wall;
   wherein the guard profile at least partially rests on the ledge when the guard profile is fastened to the base profile; and
   wherein the first arm and the second arm cooperate to provide a surface used to finish a corner produced by a floor and a wall.

2. The skirting board of claim 1, wherein the first arm is formed such that it arches away from the wall.

3. The skirting board of claim 1, wherein the base profile is provided with a series of ports.

4. A skirting board system comprising:
   a plurality of base profiles, each base profile selectively engagable to a wall and comprising a receiving portion;
   a plurality of guard profiles, each guard profile comprising a protruding portion that interfaces with the receiving portion of the base profiles;
   at least one inward-projecting end cap comprising a first plurality of interface protrusions that engage a base profile to selectively attach the at least one inward-projecting end cap with the base profile, wherein the at least one inward-projecting end cap is shaped to fit completely over a base profile;
   at least one outward-projecting end cap comprising a second plurality of interface protrusions that engage a base profile to selectively attach the at least one outward-projecting end cap with the base profile; wherein the at least one outward-projecting end cap is shaped to fit completely over a base profile;
   a first open space adapted to receive a wire, the first open space comprising four sides, wherein the first side comprises the wall, the second side is formed opposite the first side and comprises a first portion of the plurality of guard profiles the third side is formed between the first and second sides and comprises the receiving portions of the plurality of guard profiles, and the fourth side is formed opposite the third side and comprises a second portion of the plurality of guard profiles; and
   a second open space adapted to receive a wire, the second open space comprising four sides, wherein the first side comprises the wall, the second side is formed opposite the first side and comprises a first portion of the plurality of base profiles the third side comprises a floor adjoining the wall, and the fourth side is formed opposite the floor and comprise the receiving portions of the plurality of base profiles.

5. The skirting system of claim 4, further comprising a first arm formed on each of the base profiles and a second arm formed on each of the guard profiles, wherein the first arm arches away from the wall, and the second arm arches toward the wall.

6. The skirting system of claim 4, wherein the at least one inward-projecting end cap comprises a first wall and a second wall, wherein the first wall is generally perpendicular to the second wall.

7. The skirting system of claim 4, wherein the at least one outward-projecting end cap comprises a first wall and a second wall, wherein the first wall is generally perpendicular to the second wall.

* * * * *